April 19, 1932. W. N. GOODWIN, JR 1,854,901

TUBE TESTER

Filed Feb. 5, 1931

Fig. 1.

Fig. 2.

Inventor:
William Nelson Goodwin, Jr.
By Byrnes, Townsend & Potter,
Attorneys.

Patented Apr. 19, 1932

1,854,901

UNITED STATES PATENT OFFICE

WILLIAM NELSON GOODWIN, JR., OF NEWARK, NEW JERSEY, ASSIGNOR TO WESTON ELECTRICAL INSTRUMENT CORPORATION, OF NEWARK, NEW JERSEY, A CORPORATION OF NEW JERSEY

TUBE TESTER

Application filed February 5, 1931. Serial No. 513,638.

This invention relates to new and useful improvements in tube testers, and more particularly to methods of and apparatus for measuring the mutual conductance of thermionic tubes.

In determining the mutual conductance of thermionic tubes by measurement of the plate current resulting from a known or controlled grid input, the current must pass through the measuring instrument which has an appreciable impedance. Circuit arrangements operating in accordance with this general method are described in my prior Patent No. 1,689,871 and in my copending application, Ser. No. 492,560, filed Oct. 31, 1930; and other circuit arrangements have been employed. Unless compensated for in some manner, it is obvious that the impedance of the measuring device will result in an error in the measurement of the mutual conductance of the tube, since the value indicated by the current flow through the measuring instrument corresponds to the mutual conductance of the entire plate circuit instead of that of the tube per se.

Objects of the invention are to provide methods of and apparatus for obtaining a direct measurement of the mutual conductance of thermionic tubes. Further objects are to provide testing method and apparatus operative to compensate for the effects of the impedance of a measuring instrument and/or other circuit elements included in the plate circuit of the tube.

The well known relation between the grid input voltage and the plate current resulting therefrom is:

$$i_p = \frac{\mu e_g}{R_p + r} \quad (1)$$

where $i_p$ and $e_g$ are the plate current and grid input voltage respectively, $R_p$ is the impedance of the tube, $r$ is the additional resistance in the plate circuit which includes the instrument resistance, and $\mu$ is the amplification factor.

By dividing numerator and denominator by $\mu$, the equation becomes:

$$i_p = \frac{e_g}{\frac{R_p}{\mu} + \frac{r}{\mu}} \quad (2)$$

Now it is also well known that $$\frac{\mu}{R_p}$$

is equal to the mutual conductance of the tube, $g_m$.

Therefore, $$i_p = \frac{e_g}{\frac{1}{g_m} + \frac{r}{\mu}} \quad (3)$$

If $r$ is zero, then the simple relation exists:

$$g_m = \frac{i_p}{e_g} \quad (4)$$

In actual practice, this simple relationship does not obtain since the measuring instrument which is inserted in the plate circuit to measure the value $i_p$ necessarily introduces a finite impedance or external plate circuit resistance $r$. With some types of tubes and for some purposes, sufficient accuracy is obtained when it is assumed that the external resistance $r$ is so small, in comparison with $R_p$, that it may be ignored.

In accordance with the present invention, the instrument is provided with one or more scales of mutual conductance graduations upon which the mutual conductance of the tube is indicated accurately by the deflection of the instrument pointer. The instrument scale, or scales, is or are calibrated, from zero to full scale value, for values of mutual conductance corresponding to various magnitudes of plate current $i_p$, for one definite value, $\mu_0$, the amplification factor and one definite value, $r_o$, of the total plate circuit resistance external to the plate impedance $R_p$. The calibrated scale is thus determined by plate current as given by the equation:

$$i_p = \frac{e_g}{\frac{1}{g_m} + \frac{r_o}{\mu_o}} \quad (5)$$

for various values of the mutual conductance, $g_m$. For practical purposes, the amplification factor $\mu_o$ is the lowest value for which the instrument is adjusted.

It will be apparent, from an examination of Equations (2) and (5) that, for any other value of the amplification factor, the calibrated scale will not be accurate, the same values of $g_m$ are not represented by the same values of $i_p$, since the value of $$\frac{r}{\mu}$$

varies with the amplification factor.

In accordance with the invention, the mutual conductance graduations as determined for the particular values $\mu_o$ and $r_o$, may be employed for other values of the amplification factor by so adjusting the external plate resistance $r$, that its ratio to the amplification factor remains constant and equal to $$\frac{r_o}{\mu_o},$$

or $$r = r_o \frac{\mu}{\mu_o} \quad (6)$$

In actual practice this condition is readily obtained by a switch or rheostat which introduces the proper resistances into the plate circuit for various values of the amplification factor.

In the accompanying drawings which illustrate certain embodiments of the invention, Fig. 1 is a circuit diagram of a tube tester in which an adjustable resistance permits compensation for the plate circuit impedance, and Fig. 2 is a circuit diagram of a tester in which the compensation is automatically effected during the measurement of the amplification factor.

As shown schematically in Fig. 1, the appropriate energizing potentials are applied to the thermionic tube 1 from suitable current sources, such as a filament or cathode heating battery A, a plate battery B and a grid bias battery C. The alternating input voltage may be derived from the usual power line through a transformer 2 which has its secondary shunted by a voltage divider 3, the adjustable tap 4 being connected to the tube grid and one terminal of the resistance 3 being connected to the cathode. An alternating current voltmeter 5 is connected across the grid circuit to indicate the magnitude of the input voltage $e_g$.

In addition to the milliammeter 6 and plate battery B, the plate circuit includes a resistance 7, and a tap 8 which may be adjusted to include any desired portion of the resistance in the plate circuit. A scale 9 of amplification factor graduations is arranged adjacent the movable tap 8, or a knob or pointer associated with the tap.

The instrument scale is calibrated in values of mutual conductance corresponding to plate current when the tap 8 is adjusted to exclude all of the resistance 7 from the path of current flow. The method of operation will be apparent from a consideration of a specific example. For the particular amplification factor graduations shown in Fig. 1, this adjustment of the tap 8 corresponds to a value of 3.5 for $\mu_o$, and $r_o$ is equal to the resistance of the milliammeter 6, say 500 ohms. To make this calibrated scale accurate for a tube having an amplification factor of 7, it is necessary to include such portion of the resistance 7 in the plate circuit that the total external resistance $r$ satisfies Equation (6)—

$$r = 500 \times \frac{7}{3.5} = 1000.$$

In other words, the value of the resistance 7 between the amplification factor graduation of "3.5" and "7" on the scale 9 must be 500 ohms if the calibration of instrument 6 is to apply equally well in the measurement of the mutual conductance of tubes having these amplification factors.

The resistance 7 and tap 8 may take the form of a continuously adjustable rheostat, or the resistance may be tapped, with leads extended to switch points engageable by the tap 8.

The manner in which the compensating method may be applied to a tube tester having a means for measuring amplification factors is illustrated diagrammatically in Fig. 2. The general arrangement of the circuit elements may be, and preferably is, substantially the same as that shown in Fig. 1 of Patent No. 1,689,871.

As described in the patent, an electro-dynamometer ratio meter is employed in measuring various characteristic values of a tube, the alternating current passing through the coils of the ratio meter being proportional to the electrical properties involved in the fundamental definition of the tube constant.

As shown diagrammatically in Fig. 2, suitable current sources, such as batteries A, B and C, are provided for energizing the tube which is under test and voltmeters 10 are preferably included in the circuits for indicating the values of the several direct current potentials. The alternating current for energizing the field coil 11 of the ratio meter and for applying the input voltage $e_g$ to the grid circuit may be obtained from a convenient source, indicated as a generator 12, to which the input terminals 13 may be connected.

The power supply input terminals 13 are connected, through a polarity reversing switch 14 to the field winding 15 of the ratio meter, and the current supply for the measuring circuits is preferably obtained by the secondary of a transformer 16 which has its primary connected across the terminals 13. This use of a transformer is desirable in that it insulates the measuring circuits and the direct current sources from the alternating supply, thus eliminating the danger from damage by possible grounds. The same precaution may, if desired, be taken in connection with the supply of power to the field winding 15 of the meter.

The circuit connected across the secondary of the supply transformer 16 includes, in series, the resistance 17 which serves as the input impedance of the tube and across which the alternating voltage $e_g$ is developed, a fixed resistor 18, a resistance 19 and the fixed resistances 20 and 21. A resistance 22 has one terminal connected to one point 23 of the single pole, double-throw switch 24, the other point 25 of the switch being connected to a contact arm 26 which is movable over the resistance 19. The contact arm 26 is secured to an operating shaft 27 which carries a knob and pointer 28 that is movable over an amplification factor scale 29.

The blades of a double pole reversing switch 30 are connected, respectively, to the switch blade 24 and to the tube cathode, the switch serving to reverse the direction of current flow in the moving coil $a$ of the ratio meter. One set of contacts of the switch 30 is connected, through a fixed resistance 31, to the joined terminals of the moving coils $a$ and $b$, and the other set of contacts is connected to the other terminal of coil $a$. The moving coil $b$ is included in the plate circuit of the tube 1. The pointer 32 of the moving system travels over a scale 32' that is graduated in values of plate resistance $R_p$ and mutual conductance $g_m$.

The circuit elements and their arrangement, as so far described, comprise a tube tester which is substantially the same as that disclosed in my prior patent. The several measurements described in the patent may be carried out with the apparatus, as above described, to obtain the characteristic constants of the tube. In the case of the mutual conductance, however, the value given by the reading on scale 32' will be that of the plate circuit and not the tube.

To obtain readings of this tube constant, the plate batery B is not connected directly to the moving coil $b$, (as shown in Fig. 1 of my prior patent) but is connected to one terminal of a resistance 33, and the plate circuit is completed to coil $b$ by the contact arm 34 which is mounted on, but insulated from, the operating shaft 27. The contact arm 34 may engage the resistance 33 to provide a continuous adjustment of the effective plate circuit resistance to compensate for all values of amplification factor, as described above with reference to the testing circuit shown in Fig. 1. As shown in Fig. 2, the contact arm 34 engages a series of contact points 35, and the resistance 33 may take the form of separate resistors, of properly graded values, connected between adjacent pairs of contact points, it being understood that such number of contact points is used that the secondary errors resulting from the fact that the resistors are not continuously and gradually adjustable are reduced to a negligible amount.

A circuit breaker 36 is preferably included in the plate circuit, an arrangement which is made practical by this invention since the added resistance of the circcuit breaker does not introduce any error in the measurement of the mutual conductance of the tube.

To measure the mutual conductance, the amplification constant $\mu$ is first determined, thus automatically introducing such resistance into the plate circuit that the tube constant will be accurately indicated on the scale 32'. Switch blade 24 is turned upward to engage contact 25, and switch 30 is moved to its upper position.

With these connections established, the coil $a$ of the ratio meter in series with resistor 31 is connected in parallel with a part of resistance 19 and the resistor 18, and the current produced in coil $a$ opposes movement of the pointer 32 in response to the current in coil $b$ generated in the plate circuit by the grid voltage. The knob and pointer 28 is adjusted to bring the instrument pointer to zero, which indicates that the current in the plate circuit and in coil $b$ is zero, since wih no current in coil $b$, current in coil $a$ places its axis parallel to that of the field coil, i. e., at zero position of pointer 32. Under this condition, the voltage across the $a$ coil circuit is equal and opposite to the voltage generated in the plate circuit. As explained in detail in my prior patent, the ratio of the resistance between contact 26 and the cathode terminal to the grid circuit resistance 17 is a measure of the amplification factor $\mu$ and the scale 29 may therefore be graduated directly in values of amplification factor.

With the amplification constant determined, the mechanical interconnection of contact arms 26 and 34 has automatically included in the plate circuit such effective value of the resistance 33 that the $g_m$ graduations of scale 32', calibrated for the minimum value of $\mu$ and with no portion of resistance 33 in circuit, is accurate for any determined value of amplification constant. To measure the mutual conductance of the tube, the switches 14, 24, and 30 are reversed and the voltage impressed across the $a$ coil circuit is proportional to the grid input voltage $e_g$. The current through coil $b$ is equal to $i_p$, and the position of pointer 32 on the mutual conductance scale '32' indicates the value of the tube constant.

It will be apparent that the method of compensating for the external impedance of the plate circuit may be employed with circuit arrangements other than those described herein and that various types of testers which now indicate mutual conductance approximately may be revised to give direct and accurate measurements of the tube constant.

I do not limit myself to any particular form of measuring instrument nor do I limit myself to adding resistance external to the instrument as it is obvious that the resistance of the circuit external to the tube may be altered as a function of the amplification factor by making the instrument resistance itself adjustable.

Moreover the instrument may be shunted to change the scale range of mutual conductance and unless the shunt itself changes the scale characteristic, the original scale can be used for tubes of any amplification factors by the compensation method already described.

I claim:

1. In the determination of the mutual conductance of an electronic tube by utilizing the plate current flow established by a grid input voltage, the method of compensating for the external impedance of the plate circuit which comprises adjusting the external impedance as a function of the amplification constant of the tube under test.

2. In the determination of the mutual conductance of an electronic tube by utilizing the plate current flow established by a grid input voltage, the method which comprises adjusting the impedance of the external plate circuit to such a magnitude, in accordance with the amplification factor of the particular tube under test, that the ratio of the external plate impedance to the amplification factor is equal to a predetermined value and constant for all values of amplification factor.

3. In a tube tester for measuring the mutual conductance of an electronic tube, the combination with means for applying energizing potentials to the tube elements, means for impressing an alternating voltage upon the input circuit of the tube, and a measuring instrument in the plate circuit of the tube, the scale of the instrument being graduated in terms of mutual conductance for values of plate current corresponding to definite predetermined values of external plate circuit impedance and tube amplification constant, of means for rendering said scale calibration accurate for tubes having different amplification constants, said last mentioned means comprising an adjustable resistance in the plate circuit of said tube.

4. A tube tester of the type including circuit elements for energizing a tube and for applying an alternating voltage to the grid thereof, a ratio meter, one coil of said meter being included in the plate circuit of the tube, means for producing in a circuit an alternating voltage, and a current in the second coil proportional thereto, said alternating voltage to be proportional to the grid voltage and so connected as to oppose the voltage generated in the plate circuit by the grid voltage, adjustable means for varying said alternating voltage, and the current in said coil, scale graduations associated with said adjustable means and calibrated in terms of amplification factor whereby the amplification factor may be read directly from said scale when said means is adjusted to reduce the current in the first coil to zero, an adjustable resistance in the plate circuit of said tube, and means connecting the adjusting element of the adjustable resistance and the said adjustable means to insure simultaneous movement thereof, whereby the plate circuit resistance is automatically adjusted as a function of the amplification factor during the measurement of the amplification factor.

In testimony whereof, I affix my signature.

WILLIAM NELSON GOODWIN, Jr.